United States Patent
Albou et al.

(10) Patent No.: US 6,990,397 B2
(45) Date of Patent: Jan. 24, 2006

(54) SYSTEM FOR CONTROLLING THE IN SITU ORIENTATION OF A VEHICLE HEADLAMP, AND METHOD OF USE

(75) Inventors: Pierre Albou, Boginy (FR); Joël Leleve, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 29 days.

(21) Appl. No.: 10/732,382

(22) Filed: Dec. 9, 2003

(65) Prior Publication Data

US 2004/0167697 A1 Aug. 26, 2004

(30) Foreign Application Priority Data

Dec. 9, 2002 (FR) .................... 02 15875

(51) Int. Cl.
*B60Q 1/04* (2006.01)
(52) U.S. Cl. ............... 701/49; 362/460; 362/465; 382/104; 315/82
(58) Field of Classification Search ........ 362/460, 362/464, 465, 466; 701/49; 382/104; 315/77, 315/82; 348/113, 118, 148
See application file for complete search history.

(56) References Cited

U.S. PATENT DOCUMENTS

| 4,970,653 | A | * | 11/1990 | Kenue ................. 701/301 |
| 4,985,816 | A | * | 1/1991 | Seko et al. ................. 362/303 |
| 5,359,666 | A | * | 10/1994 | Nakayama et al. ......... 382/104 |
| 5,660,454 | A | * | 8/1997 | Mori et al. ................. 362/466 |
| 5,876,113 | A | * | 3/1999 | Gotoh ................. 362/466 |
| 6,144,159 | A | * | 11/2000 | Lopez et al. ................. 315/82 |
| 6,254,259 | B1 | * | 7/2001 | Kobayashi ................. 362/465 |
| 6,709,135 | B2 | | 3/2004 | Couillaud et al. |
| 2002/0130953 | A1 | * | 9/2002 | Riconda et al. ............. 348/115 |

FOREIGN PATENT DOCUMENTS

| DE | 19602005 | | 8/1996 |
| EP | 1201498 | | 5/2002 |
| JP | 2001093311 A | * | 4/2001 |

\* cited by examiner

Primary Examiner—Michael J. Zanelli
Assistant Examiner—Eric M. Gibson
(74) Attorney, Agent, or Firm—Morgan & Finnegan, LLP

(57) ABSTRACT

A system and method for controlling the in situ orientation of the headlamps of a vehicle, from a camera that is mounted in the headlamp, as a function of the attitude of the vehicle. A camera is secured to a reflector of the headlamp so as to film the road extending in front of the vehicle. An image processing unit processes at least two successive images in order to determine a measured horizon line of the road scene in front of the vehicle. A setpoint horizon line has been determined beforehand during initial adjustment of the headlamp. The real horizon line is then brought closer to the setpoint horizon line by modifying the orientation of the headlamp, until the distance between the measured line and the setpoint line tends towards zero.

14 Claims, 3 Drawing Sheets

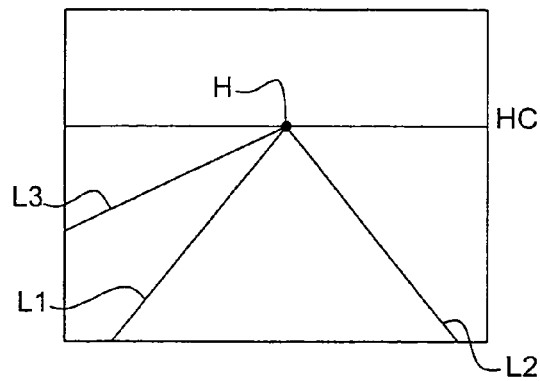
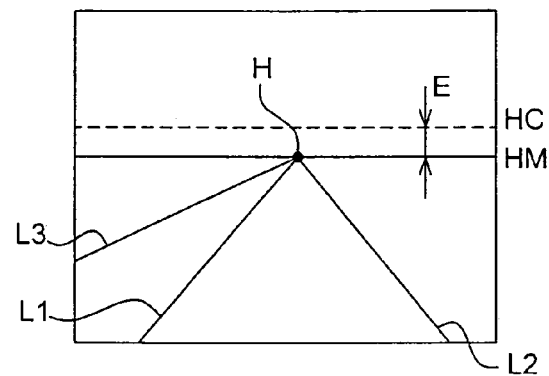
Fig. 3A  Fig. 3B
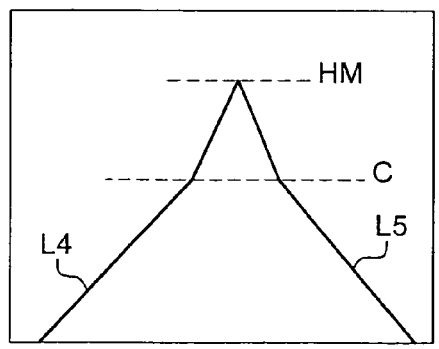
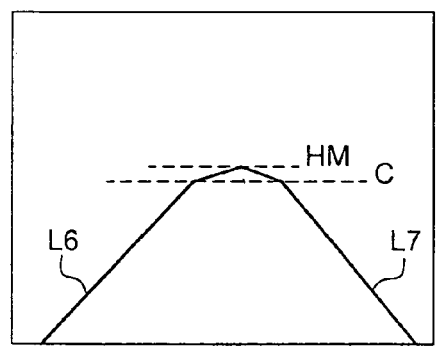
Fig. 4  Fig. 5

SYSTEM FOR CONTROLLING THE IN SITU ORIENTATION OF A VEHICLE HEADLAMP, AND METHOD OF USE

FIELD OF THE INVENTION

The invention relates to a system for controlling the in situ orientation of a vehicle headlamp providing constant lighting of the road, irrespective of the attitude of the vehicle. The invention also relates to a method allowing use of this control system.

The invention finds applications in the field of road-going vehicles such as, for example, cars or heavy goods vehicles. In particular, it finds applications in the field of the projection of light by these vehicles onto the road.

PRIOR ART

At present, all road-going vehicles comprise a device for lighting the road, said device being used in particular at night or during bad weather. Conventionally, there are two types of lighting used in motor vehicles: lighting known as "full beam", which lights up the road as a whole over a long distance, and lighting known as "dipped beam", which lights up the road over a short distance so as to avoid dazzling the drivers of vehicles that are liable to come in the opposite direction. Full beam lighting is realized by means of full beam headlamps which each emit a light beam directed towards the horizon. Dipped beam lighting is realized by means of dipped beam headlamps which each emit a block of downward-directed light, giving visibility over a distance of around 60 to 80 meters.

In the case of dipped beam lighting, the range of the lighting is adjusted by orienting the headlamps in the vertical plane. Conventionally, the orientation of the light beam emitted by the dipped beam headlamps is adjusted by specialists, in particular motor vehicle mechanics, according to the instructions given by the lighting device manufacturer. The angle of orientation of the light beam is given by the manufacturer in percent radiant. This angle of orientation of the light beams is given for a vehicle in a standard position. The term "standard position" of the vehicle refers to the position in which the chassis of the vehicle is approximately parallel to the road, that is to say that the angle formed by the chassis of the vehicle and the horizontal plane is flat. It is then said that the attitude of the vehicle is flat.

However, it is known that the attitude of the vehicle may be modified as a function of the situation in which the vehicle finds itself (acceleration, braking, etc.) and as a function of the load of the vehicle. This is because when the vehicle is carrying a heavy load, the rear of the vehicle is lowered, which means that the front of the vehicle is raised. The vehicle is therefore no longer parallel to the road. In this case, the light beams of the dipped beam headlamps of the vehicle are directed towards the horizon instead of being directed towards the road. They may therefore dazzle the drivers of vehicles coming in the opposite direction.

By contrast, when the vehicle is braking the front of the vehicle tilts towards the road. The vehicle is therefore no longer parallel to the road. In this case, the light beams of the dipped beam headlamps light up the road just in front of the vehicle. The driver of the vehicle then no longer has sufficient visibility to be able to take in the situation around him.

It will therefore be understood that the initial adjustment of dipped beam headlamps, carried out for a vehicle in the standard position, is incorrect as soon as the attitude of the vehicle is no longer flat, that is to say when the front of the vehicle is raised or lowered.

In order to overcome this drawback, some vehicles are equipped with an automatic correction system that is fixed to the chassis of the vehicle. This automatic correction system comprises sensors placed on the front and rear axles of the vehicle, each of said sensors measuring the difference in height between the position of the wheel and the chassis as a function of the load of the vehicle. A small computer, integrated in the automatic correction system, makes it possible to determine the attitude of the vehicle and to send information to small motors which orient the headlamp. However, this system has drawbacks. This is because the sensors are placed close to the wheels, that is to say at points which are difficult for a human or robot to access during manufacture of the vehicle. Thus, the operation of fitting the sensors, during manufacture of the vehicle, requires a great deal of precision and, consequently, a high investment in terms of time and money. Moreover, these sensors are located at points which are subject to being hit by water, gravel and other elements which may be found on the road. The connections of these sensors, and also the sensors themselves, must therefore be robust in order to withstand such hits.

SUMMARY OF THE INVENTION

It is an object of the invention to overcome the drawbacks of the system described above. For this purpose, the invention proposes an intelligent system for controlling the in situ orientation of the headlamps of a vehicle, from a camera that is mounted in the headlamp, as a function of the attitude of the vehicle. This system consists in fixing a camera to the reflector of the headlamp (or, more generally, in securing it to the reflector) so as to film the road extending in front of the vehicle. An image processing unit processes successive images (for example at least two) in order to determine a measured horizon line of the road scene in front of the vehicle. A setpoint horizon line has been determined beforehand during initial adjustment of the headlamp. The real horizon line is then brought closer to the setpoint horizon line by modifying the orientation of the headlamp, until the distance between the measured line and the setpoint line tends towards zero.

More precisely, the invention relates to a system for controlling the in situ orientation of a vehicle headlamp equipped with a light source that is fixed to a mobile reflector, wherein it comprises a camera that is fixed to the mobile reflector (or, more generally, a camera in the headlamp and in particular secured to the reflector) and connected to an image processing unit.

The invention also relates to a method of controlling the in situ orientation of a vehicle headlamp, wherein it comprises the following operations:

recording of successive images of a road scene in front of the vehicle, processing of at least one image of the road scene and production of a processed image, determination, from said processed image, of a measured horizon line of the road scene, comparison of this measured horizon line with a predetermined setpoint horizon line and determination of a distance between the measured horizon line and the setpoint horizon line, adjustment of the orientation of the headlamp so that the distance between the measured horizon line and the setpoint horizon line tends towards zero.

BRIEF DESCRIPTION OF THE DRAWINGS

FIGS. 3A and 3B schematically show two cases of lighting on the road of FIGS. 2A and 2B.

FIGS. 4, 5 and 6 show particular cases in which the method of the invention can also be used.

DETAILED DESCRIPTION OF EMBODIMENTS OF THE INVENTION

Figure 1:
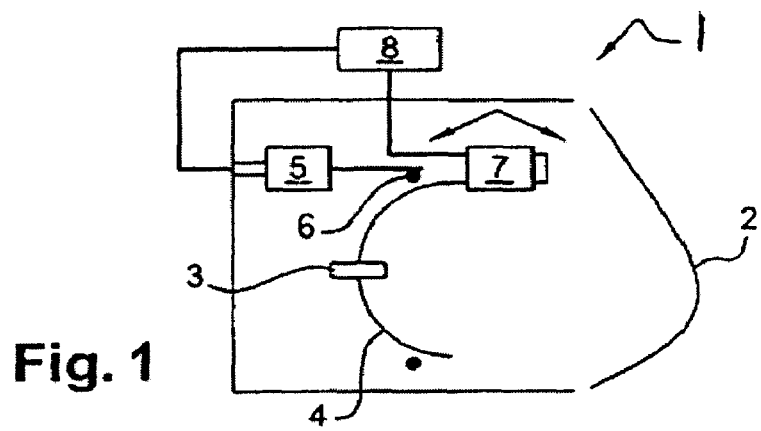
FIG. 1 shows a vehicle headlamp equipped with a control system according to the invention.

FIG. 1 shows a dipped beam headlamp of a vehicle, equipped with an orientation control system according to the invention. More precisely, this FIG. 1 shows a headlamp 1 equipped with optics 2 (covering for closing the headlamp, and possibly other parts having an optical role of the lens type) and with a light source 3 mounted on a mobile support 4. This mobile support 4 is the reflector of the headlamp. This reflector 4 is actuated by a motor 5 associated with a rotation device 6, such as a ball joint. Inside the headlamp 1, arrows show the rotary movements of the reflector 4 and, in particular, of the light source 3 secured to the reflector 4. This light source 3 may be a light source that is conventional for a vehicle headlamp. Likewise, the reflector 4, the optics 2, the motor 5 and the rotation device 6 may be elements that are conventional in a vehicle dipped beam headlamp.

On this reflector 4, there is likewise mounted a camera 7, which is secured to the reflector 4. This camera 7 may therefore be displaced angularly at the same time as the reflector 4 and the light source 3.

The camera 7 is preferably suited to recording nighttime views. It may be, for example, an infrared camera.

The camera 7 records successive and instantaneous views of the road scene in front of the vehicle. It then transmits these views, or images, to an image processing unit 8. The latter is also connected to the motor 5, which controls the orientation of the headlamp as a function of the information received from the image processing unit 8.

As will be explained in more detail below, the image processing unit 8 processes at least two of the successive images transmitted by the camera. The aim of this processing is to determine a measured horizon line of the road scene and to compare it with a setpoint line. The measured horizon line is the horizon line determined for the road scene under consideration. The setpoint horizon line is a horizon line that was predetermined during a step of initial adjustment of the headlamp. In other words, the setpoint horizon line is determined in the same way as the measured horizon line but under ideal initial conditions, such as for example at the time the vehicle is put onto the market or during a routine check of the vehicle. This setpoint line is therefore determined by a professional, for a vehicle with a flat attitude.

As will be seen in more detail below, the invention proposes that the real horizon line of the vehicle be measured and compared with the setpoint horizon line that has been determined beforehand.

In the embodiment of FIG. 1, the processing unit 8 comprises a microcomputer. It is this microcomputer which determines the distance between the measured horizon line and the setpoint horizon line and also the displacements which the reflector must undergo. In another embodiment of the invention, it is the computer of the actual vehicle itself which is used to determine this distance and these displacements. The image processing unit is then connected to this computer, which is itself connected to the motor 5.

The processing of the images recorded by the camera 7 will now be described in detail, on the basis of examples of images. In particular, FIGS. 2A and 2B show, respectively, a natural image and a processed image of an example of a road scene in front of a vehicle.

Figure 2A:
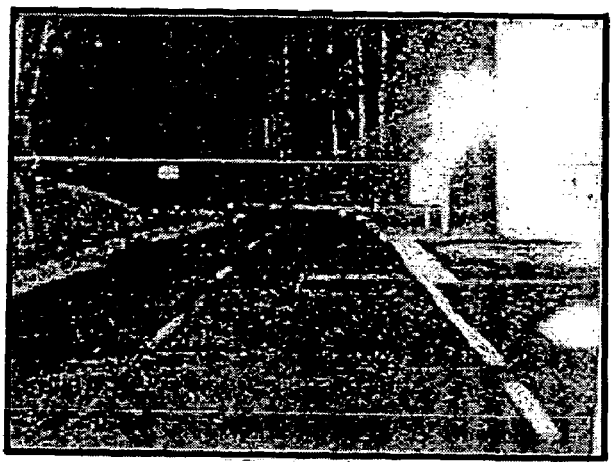
FIG. 2A shows an example of an image of a road scene in front of the vehicle.
Figure 2B:
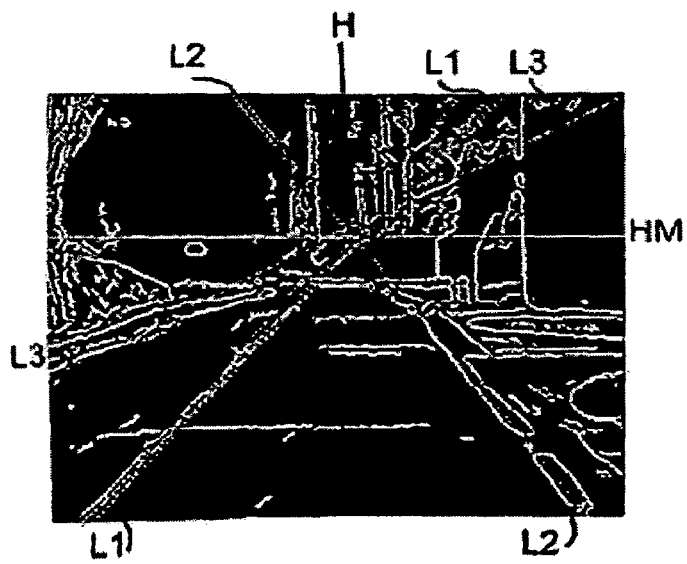
FIG. 2B shows the image of FIG. 2A after having been processed.

FIG. 2A shows an image recorded by the camera 7 and referred to as the natural image, as opposed to the processed image shown in FIG. 2B. FIG. 2B shows the same road scene as image 2A, but following processing by the image processing unit 8. In one embodiment of the invention, this processing comprises the following operations:

At least two of the natural images of the road scene that are recorded by the camera are transmitted to the image processing unit. These images may be two successive images.

The processing unit 8 compares these two natural images. According to one embodiment of the method of the invention, this comparison is a subtraction of one of the images from the other. This subtraction makes it possible to withdraw the constant zones, that is to say the zones which are identical on the first and second images. In other words, the image obtained by subtraction of the two natural images makes it possible to show the zones which have moved, that is to say the zones and all the elements that are connected with the speed of the vehicle.

The image processing unit 8 then carries out thresholding of the image obtained by subtraction. This thresholding consists in suppressing all the grey areas of the image and in replacing them with white or black areas, depending on the initial grey levels. The processed image of FIG. 2B is thus obtained.

In another embodiment of the invention, a single image is processed by means of a mathematical transform applied to each pixel of the image or to sets of pixels of the image. This mathematical transform may be, for example, the Hough transform.

The method of the invention then proposes studying this image and searching therein for the vanishing lines and also the points of convergence of these vanishing lines. These vanishing lines meet at the horizon. It is thus possible to determine the measured horizon of the road scene, that is to say the real horizon for the situation in which the vehicle finds itself, at the instant under consideration.

In FIG. 2B, the references L1, L2 and L3 refer to the vanishing lines of the processed image. These vanishing lines meet at a horizon point H. From this point H, it is possible to deduce the location of the setpoint horizon line HC, which is horizontal and passes through this point H.

FIG. 3A shows the same road scene as that of FIG. 2B, but in a schematic representation. This FIG. 3A is not an image that is actually obtained during image processing. Rather, it is an image that is merely intended to give a better understanding of the invention. This FIG. 3A shows the important elements picked out on the image of FIG. 2B and, in particular, the various lines that make it possible to apply the rest of the method of the invention. These lines are the vanishing lines L1, L2 and L3 which intersect at the point of intersection H. The measured horizon line HM passes through this point H.

The method of the invention then consists in comparing the measured horizon line HM with the predetermined setpoint horizon line HC. In the case of FIG. 3A, the setpoint line HC and the measured line HM are coincident. It can be deduced therefrom that the adjustment of the headlamp is correct and that no correction of the orientation of the headlamp is necessary.

In the case of FIG. 3B, it can be seen that the measured line HM and the setpoint line HC are separated by a distance E. Since the measured horizon line is below the setpoint line, it can be deduced therefrom that the front of the vehicle is lowered.

In practice, the setpoint line is determined as being located on one of the frame lines of the camera. Thus, the distance E is calculated in terms of number of frame lines.

The information relating to the distance E is then supplied to the motor 5 which modifies the orientation of the headlamp by raising it until the measured horizon line is coincident with the setpoint line. In other words, the inclination of the headlamp, and in particular of the light source, is modified until the distance E tends towards zero. In practice, the distance E is converted into a control signal of the motor 5 so as to return to the setpoint value of the horizon line.

In practice, the positioning of the measured horizon line on the setpoint line is verified by means of the camera, that is to say by visualizing, on the images taken instantaneously by the camera, the two horizon lines HM and HC.

The method of the invention, as has just been described, makes it possible to keep the visibility distance constant, irrespective of the attitude of the vehicle, by supplying a light beam oriented at an angle that is constant with respect to the road.

This method may be used in a conventional case of a relatively flat road, as shown in FIGS. 2 and 3. However, it can also be used in more particular cases, such as the bottom of a valley or the top of a hill. In this case, the method is used in the same manner as that described above in the case of a flat road.

FIG. 4 shows the particular case of a road at the bottom of a valley. This case is shown schematically, just like the preceding examples of FIGS. 3A and 3B. The particular case shown in FIG. 4 is the case where the vehicle is at the bottom of a valley and is getting ready to go up a hill or a mountain. In this example, the part below the dotted line C shows the road which is at the bottom of the valley and which forms the vanishing lines L4 and L5. At the dotted line C, the vanishing lines L4 and L5 are cut, that is to say that they form a non-flat angle with the initial vanishing lines. This cut C in the vanishing lines indicates the point at which the road begins to climb, that is to say where the road is inclined with respect to the part of the road that was flat at the bottom of the valley. As shown in FIG. 4, it can be seen that it is possible to determine two measured horizon lines: one line with the part of the vanishing lines located below the cut C and one line HM with the part of the vanishing lines located above the cut C. It is this latter horizon line, that is to say the horizon line measured in the upper part of the image, which is taken into consideration in the case of the bottom of a valley. This measured horizon line HM is determined in exactly the same way as in the case of FIGS. 2 and 3.

FIG. 5 schematically shows the particular case of a vehicle at the top of a hill. In this case, the vehicle is at the top of a hill and is about to reach a flat road or a road with a downward slope. As can be seen in FIG. 5, the vanishing lines L6 and L7 of the road going up the hill are cut at line C. As in the preceding case, it is possible in theory to determine two measured horizon lines: one line with the part of the vanishing lines located below the cut C and one line HM with the part of the vanishing lines located above the cut C. In practice, it is the horizon line measured in the upper part of the image which is taken into consideration in the case of the top of a hill. This measured horizon line HM is determined in exactly the same way as in the case of FIGS. 2 and 3.

It will therefore be understood that, irrespective of the geometry of the road on which the vehicle is travelling, that is to say rectilinear or sloping, the horizon line can always be determined from the vanishing lines. And, once the measured horizon line has been determined, the orientation of the headlamp can be controlled.

Figure 6:
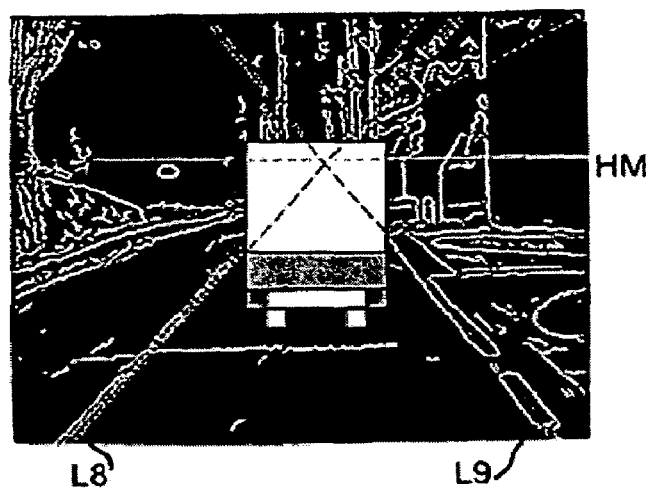

FIG. 6 shows a particular situation in which a vehicle may find itself. This situation is one in which an obstacle, such as another vehicle, in particular a vehicle of a relatively substantial size of the heavy goods vehicle type, is travelling on the road in front of the vehicle under consideration. FIG. 6 shows the image obtained after processing in a situation such as this. It can be seen that, in this case, the lorry has hampered the recording of images of the road scene. The image obtained after processing comprises only part of the vanishing lines L8 and L9. However, using this part of the detected vanishing lines, located between the lorry and the vehicle, it is possible to extrapolate the rest of these vanishing lines. These extrapolated lines are shown in dashed line in FIG. 6, in the continuation of the vanishing lines L8 and L9. The measured horizon line HM may then be determined, from these extrapolated vanishing lines, in the same manner as that explained above. Realistic correction of the image is thus obtained.

However, this extrapolation in the event of an obstacle may lead to a reduction in the precision with which the headlamp is oriented. In order to avoid this, it is possible to conjugate the determination of the measured horizon line with the emission of a light spot or of a figure by a light source which can be identified on a video image. This method consists in emitting a specific light drawing that is not visible to the driver's naked eye but can be identified by the camera either on account of its high luminosity or by virtue of a particular modulation, such as flashing. This light source may be, for example, a source of laser rays. In this case, the light source is mounted in the headlamp so as to be secured to the mobile reflector. It emits a beam which contributes to restoring the vanishing lines. In this way, the orientation of the headlamp is adjusted as a function of information that takes into account, on the one hand, the distance E and, on the other hand, the shape of the specific drawing. This information may be obtained by geometric calculations or by the knowledge of a neural network that carried out its learning process during visibility sequences without any obstacles.

Figure 7A:
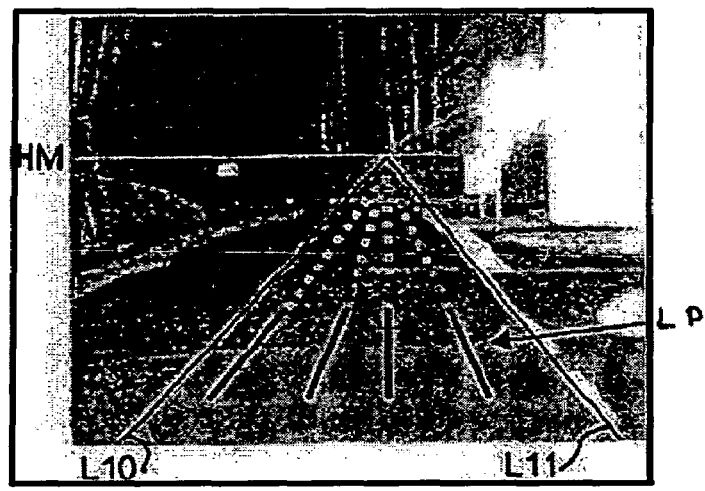
FIGS. 7A and 7B show one embodiment of the invention, in which the system comprises a light line generator.

The specific drawing may be, in particular, a beam of parallel lines emitted, for example, by a diffraction network or by a system of lenses. This case may be used in the presence of an obstacle or else under difficult road conditions such as dense traffic. FIG. 7A shows an example of a processed image of a road scene in the case where parallel lines are projected. This FIG. 7A shows the vanishing lines L10 and L11 and also the projected lines LP which, on the processed image, form segments of vanishing lines which contribute, with the vanishing lines L10 and L11, to determining the measured horizon line. The precision with which the horizon line is determined is proportional to the number of parallel lines. Preferably, these parallel lines are emitted so as to be close to the vehicle, for example a few meters in front of the vehicle, so as not to be adversely affected by the presence of the vehicles in front.

Figure 7B:
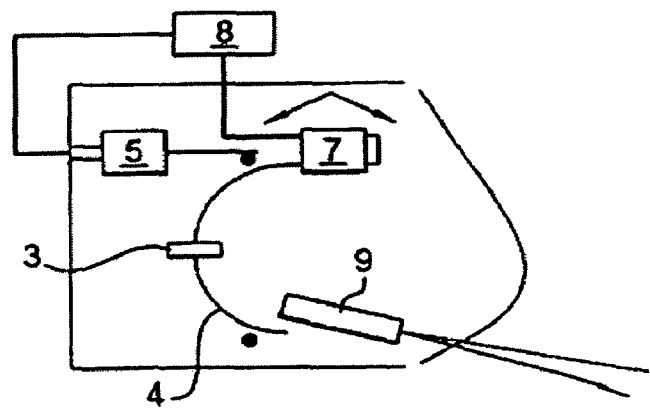

FIG. 7B shows the system of the invention in the case where it comprises means for emitting parallel light lines. This system comprises elements that are identical to those described with reference to FIG. 1. It moreover comprises a light line generator 9 mounted on the mobile reflector 4. Preferably, this light line generator 9 is fixed to that end of the reflector which is opposite to that where the camera 7 is fixed. This light line generator is directed towards the front close to the vehicle and is oriented so that the light lines are placed between the vanishing lines L10 and L11.

The system of the invention which has just been described may be used in a vehicle equipped with an on-board computer. The image processing unit 8 may then be integrated in the vehicle's on-board computer. In this case, all that is required is for there to be integrated, in the on-board computer, suitable software allowing the processing of images based on images from the camera and allowing control of the motor which actuates the reflector of the headlamp. The cost of this control system is therefore almost imperceptible to the manufacturer. Otherwise, an image processing unit, which may or may not include a microcomputer, may be added in the vehicle.

The system of the invention may also be associated with a GPS and with a mapping system in order to be aware of the vertical variations of the ground and thus anticipate the control operations of the headlamps.

What is claimed is:

1. System for controlling the in situ orientation of a vehicle headlamp equipped with a light source that is fixed to a mobile reflector, which comprises:
   a camera that is fixed to the mobile reflector and connected to an image processing unit for processing of at least one image of the road scene;
   means for determining, from said processed image or images, a measured horizon line of the road scene;
   means for comparing this measured horizon line with a predetermined setpoint horizon line and determining a distance between the measured horizon line and the setpoint horizon line; and
   means for adjusting the orientation of the headlamp so that the distance between the measured horizon line and the setpoint horizon line tends towards zero.

2. Control system according to claim 1, wherein the camera is mounted at one end of the reflector.

3. Control system according to claim 1, wherein the camera is an infrared camera.

4. Control system according to claim 1, which comprises a light line generator.

5. Vehicle headlamp comprising a mobile reflector that is actuated by a motor and a light source that is fixed to the reflector, wherein the in situ orientation of the headlamp is controlled by the control system according to claim 1.

6. Method of controlling the in situ orientation of a vehicle headlamp, comprising the following operations:
   recording of images of a road scene in front of the vehicle,
   processing of at least one image of the road scene,
   determination, from said processed image or images, of a measured horizon line of the road scene,
   comparison of this measured horizon line with a predetermined setpoint horizon line and determination of a distance between the measured horizon line and the setpoint horizon line,
   adjustment of the orientation of the headlamp so that the distance between the measured horizon line and the setpoint line tends towards zero.

7. Control method according to claim 6, wherein the image processing operation consists in processing at least two images in order to deduce therefrom a processed image.

8. Control method according to claim 7, wherein the operation of processing two images consists in subtracting one image from the other.

9. Control method according to claim 8, wherein the operation of processing two images consists in carrying out a thresholding on the image obtained after subtraction.

10. Control method according to claim 6, wherein the operation of determining a measured horizon line consists in determining vanishing lines in the processed image and in deducing therefrom the horizon line.

11. Control method according to claim 6, wherein the setpoint horizon line is determined from the vanishing lines in a processed image, during initial adjustment of the headlamps.

12. Control method according to claim 6, wherein the distance between the measured horizon line and the setpoint horizon line corresponds to a number of frames of the camera.

13. Control method according to claim 6, wherein the setpoint horizon line is extrapolated as a function of the vanishing lines.

14. Control method according to claim 6, wherein light lines are emitted by the headlamp, forming, on the processed image, segments of vanishing lines.

* * * * *